April 8, 1941.  E. B. MAILLART  2,237,571
WELD PROBING APPARATUS
Filed Oct. 19, 1939  2 Sheets-Sheet 2
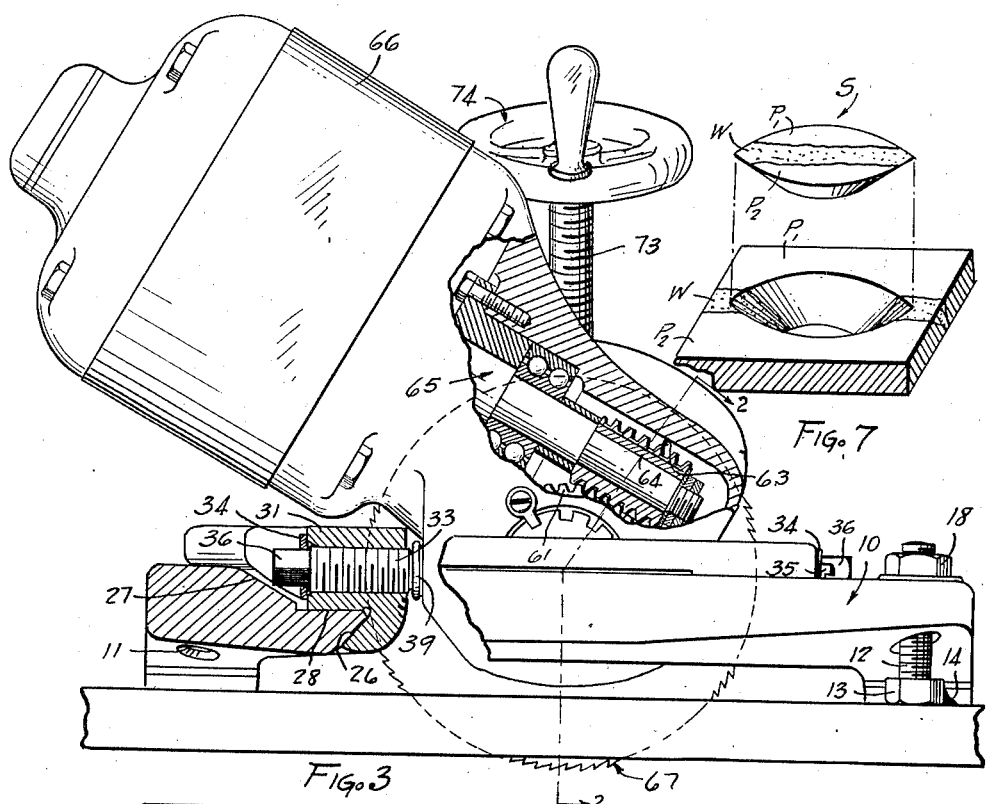
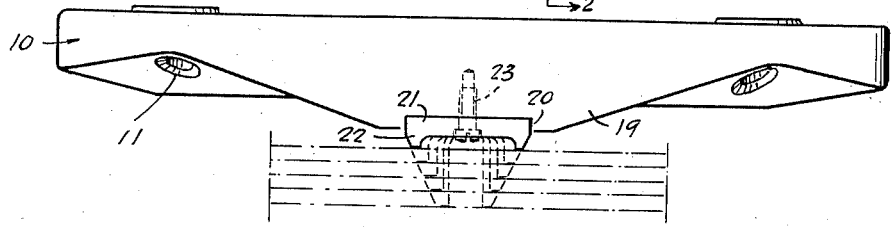
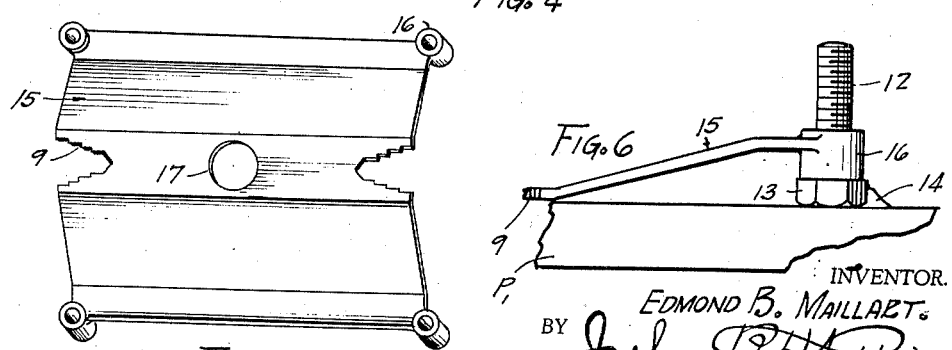
INVENTOR.
EDMOND B. MAILLART.
BY Joshua R H Potts
ATTORNEY.

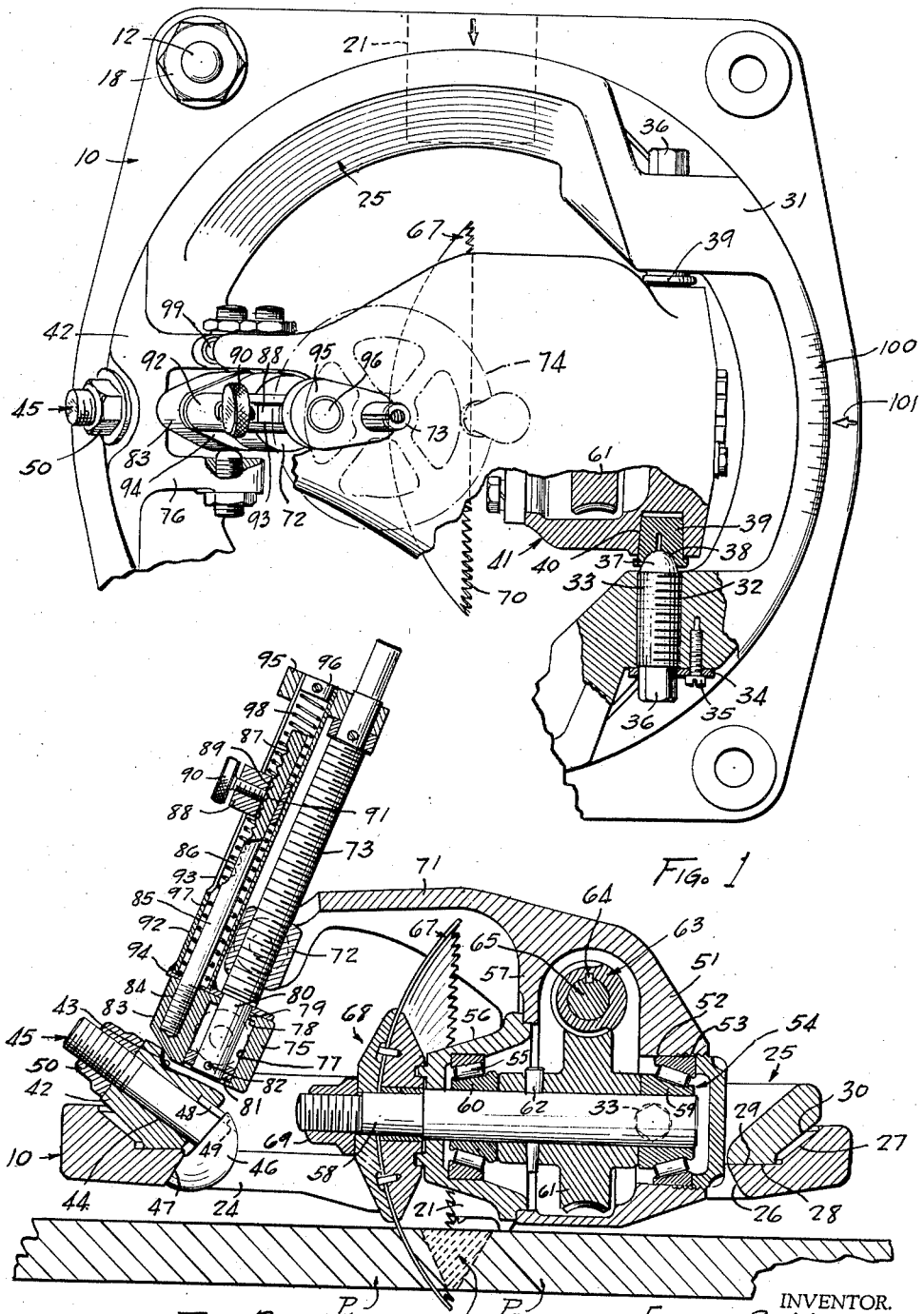

Patented Apr. 8, 1941

2,237,571

UNITED STATES PATENT OFFICE 2,237,571

WELD PROBING APPARATUS

Edmond B. Maillart, Philadelphia, Pa., assignor to Frederick M. Bowers, Chester, Pa.

Application October 19, 1939, Serial No. 300,163

19 Claims. (Cl. 29—69)

This invention has to do with the probing of a weld and is concerned primarily with the provision of novel apparatus for effecting weld probing operations.

In the various types of constructional work involving the joinder of metallic plates, such as steel plates, being welded it becomes necessary for inspection and testing purposes to probe the weld. Heretofore it has been the practice to cut out cylindrical or conically shaped plugs or specimens at appropriate points along the welded joints, and these specimens have been examined and tested to ascertain if the welded joint is satisfactory and will meet the necessary requirements.

Obviously it becomes necessary to refill the openings, and in those cases where the specimens are cylindrical it has been the practice to tap the openings to form a thread, and screw in a plug that is complementally threaded. In those cases where the specimen is conical it has been impossible to obtain a completely solid specimen, as the conical specimen usually has a hole in the center thereof which is a necessary incident to the cutting out of the conical specimen. In view of the undesirability of this marred conical specimen, and further in view of the difficulties and inconvenience which have been experienced in the refilling of the cylindrically shaped openings, this invention has in view, as its foremost objective, the provision of novel apparatus which may be employed to cut out a solid completely intact specimen from the welded joint, and which specimen is such a shape that it will leave a recess of an irregular character that may be readily filled by a welding material.

More in detail the invention has as an object the provision of apparatus which will cut out a solid specimen, leaving a recess in the welded joint that has a comparatively wide mouth on one face of the plate, and a small opening on the opposite face of the plate.

Still more in detail the invention has in view, as an object, the provision of weld probing apparatus which will cut out a solid boat-shaped specimen leaving a correspondingly shaped recess in the joint.

In providing apparatus of the character above noted the invention proposes the use of a saw blade in the form of a concavo-convex disk having saw teeth formed on its peripheral edge.

An important object of the invention is the provision of means for operatively mounting this concavo-convex saw blade so that it may be fed to the steel plates in a required manner. It is well recognized in the metal working arts that the cutting of steel by sawing operations requires that the saw blade be nicely fed to the work, with the pressure on the blade accurately controlled. Otherwise there is grave danger of the blade being damaged.

The invention, therefore, has in view, as a further more detailed object, the provision of weld probing apparatus of the character above noted which includes means for yieldably urging the saw blade against the work. This yielding application of feeding pressure on the saw blade provides semi-automatic feeding and readily accommodates any dangerous and extraordinary resistance to the rotation of the saw which might damage the blade or device.

Inasmuch as it is necessary to operate the saw blade to first cut one side of the boat-shaped specimen, and then remove the saw blade from the work and reposition the same to cut the other side, accurate positioning of the cutting apparatus on the work is an important factor.

With this condition in mind another highly important object of the invention is the provision of apparatus of the character above noted which includes means for rigidly securing the same to the plates on each side of the weld which is to be probed. This feature of the invention is of extreme importance when it is remembered that the plates having the welds which are to be probed assume various horizontal and vertical positions, and it is often necessary to probe an overhead weld.

Still another object of the invention is the provision of weld probing apparatus of the character above described which includes a concavo-convex saw blade of the type noted, together with power means for driving the same, and manually operable means for feeding the blade to the work.

Still another more detailed object in view is the provision of such apparatus which includes means for pivotally mounting the same on the plates having the weld which is to be tested. With the saw blade power driving means and feeding mechanism so pivotally mounted, the blade may be readily swung from the position in which it cuts one side of the boat-shaped specimen over into the position in which the other side is cut. This pivotal mounting of the blade and associated mechanism permits of the specimen being cut at any desired angle with respect to the line of the welded joint.

Yet another object of the invention is the provision of weld probing apparatus of the character above noted which includes a supporting framework which is anchored to the plates by tack welding.

More in detail the invention contemplates an arrangement wherein the required number of bolts have their heads tack welded to the plates at appropriate points, and these bolts extend through openings in the mounting framework and nuts screw thereon to securely bolt the framework in position.

Another highly important object of the invention is the provision of weld probing apparatus of the character above noted which may be readily adjusted to provide boat-shaped specimens of different sizes which generally correspond to the thickness of the plates having the butt-welded joints.

Various other more detailed objects and advantages of the invention such as arise in connection with carrying out the above noted objectives in a practical embodiment will in part become apparent, and in part be hereinafter stated, as the description of the invention proceeds.

The invention, therefore, comprises novel weld probing apparatus which may be operated to cut out a solid, intact boat-shaped specimen from a welded joint at any angle with respect to the line of the joint itself.

This application is a continuation in part of the co-pending application of Edmond B. Maillart, Serial No. 233,762, filed October 7, 1938, and entitled "Method of and apparatus for probing a weld."

For a full and more complete understanding of the invention reference may be had to the following description and accompanying drawings, wherein Figure 1 is a top plan view of weld-probing apparatus made in accordance with the precepts of this invention with parts broken away, Figure 2 is a side view taken as a section through the apparatus about on the plane represented by the line 2—2 of Figure 3, Figure 3 is a side view normal to the showing of Figure 2, with parts being shown in elevation and parts in section, Figure 4 is a side view of the supporting framework bringing out in dotted lines several removable pieces, any one of which is attached to the framework in accordance with the size of the specimen which is to be cut from the welded joint, Figure 5 is a detailed view in perspective of a template which is employed in tack welding the anchoring bolts to the plates, Figure 6 is a fragmentary view in side elevation showing the mode of usage of the template, and Figure 7 is a detailed perspective showing the specimen as removed from the plates in an exploded relationship.

Referring now to the drawings, wherein like reference characters denote corresponding parts, and more particularly to Figure 2, two steel plates are identified at $P_1$ and $P_2$ and are butt-welded together by a butt-welded joint referred to generally as W.

The apparatus of this invention hereinafter to be described is intended to cut a boat-shaped specimen from the joint W, such a specimen being shown in Figure 7 and identified by the reference character S. The apparatus for cutting out the specimen S comprises a mounting framework 10 of generally rectangular formation which is formed with bolt openings 11 at each corner. Threaded bolts 12 having heads 13 are tack welded to the plates $P_1$ and $P_2$, as shown at 14 in Figure 6.

To insure of accurate positioning of the bolts 12, a template, such as shown in Figure 5, may be employed. This template is designated 15, and the bolt openings 16 therein have relative positions that exactly correspond to the openings 11 in the mounting framework 10. Thus a bolt 12 is positioned in each of the openings 16 of the templates 15, whereupon the latter is positioned over the plates $P_1$ and $P_2$ with the spotting opening 17 directly overlying the weld W. The template 15 has each side edge formed with gauges in the form of a stepped recess 9 to adapt the template to joints of varying widths. The heads 13 of the bolts 12 are then tack welded to the plates $P_1$ and $P_2$, after which the template 15 is removed.

The supporting framework 10 is now positioned with the bolts 12 being received in the openings 11, whereupon nuts 18 are screwed on the threaded extremities of the bolts 12 to securely clamp the mounting framework 10 in position.

Referring more particularly to Figure 4, the framework 10 is shown as having downwardly depending central portions 19 that are disposed essentially centrally of the framework. These downwardly depending portions 19 are formed with central recesses 20 in which are received yokes 21 having legs 22 that are designed to straddle the weld W. These yokes 21 are detachably held in position in the recesses 20 by the screw bolt shown at 23, and in accordance with the broken line showing of Figure 4 may be replaced by other yokes 21 having legs 22 of varying length. The length of these legs 22 will depend upon the size of the boat-shaped specimen which is to be removed. It suffices to say at this time that the extremities of the legs 22 engage the plates on each side of the weld W.

The mounting framework 10 is formed with a large circular opening 24 in which is mounted a swivel carriage identified at 25. In this connection it is notable that the cross sectional shape of the framework 10 about the opening 24 is illustrated in Figures 2 and 3, and is shown as including a lower truncated conical wall 26 and an upper truncated conical wall 27 of larger diameter that is connected to the lower conical wall 26 by the horizontal wall 28.

The swivel carriage 25 has a ring-like surface 29 corresponding to the wall 28 and in engagement therewith, and an outer conical wall 30 which might be said to be complemental to the truncated conical surface 27.

The swivel carriage 25 is formed with a pair of supporting arms 31 that are disposed in parallel relationship and which are formed with threaded openings designated 32.

The arms 31 include structural parts that extend beneath the mounting frame 10 and engage the surface 26, as shown in Figure 3.

Screwed into each of the openings 32 is a pivot pin 33 that is held in position by a lock washer 34 that is in turn anchored to the swivel carriage 25 by a set screw shown at 35. It will be noted that the lock washer 34 has a non-circular opening that is complemental to and receives a non-circular head 36 on the pin 33.

The inner end of each of the pins 33 extends beyond the arms 31 and is of a formation constituting the same a trunnion, which is designated 37. The trunnions 37 are received in recesses 38 formed in bearing members 39. These bearing members 39 are positioned in sockets 40 formed in a framework of a swinging carriage designated 41.

Located substantially at the extremity of a diameter extending intermediate the arms 31 the swivel carriage 25 is formed with an enlarged portion 42 that is cut away at its upper surface to provide a recess 43 for a purpose to be hereinafter pointed out.

Extending through the enlarged portion 42 is an opening 44, and received in this opening is a bolt 45. The bolt 45 carries a so-called cap head 46, the latter having a surface at 47 that engages the truncated conical surface 26 on the mounting framework 10. The bolt 45 is held against rotation by a pin 48 one end of which is anchored in part 42, and the other of which is received in a recess 49 in cap head 46. A nut 50 is threaded on the extremity of the bolt 45.

It is evident that when the nut 50 is tightened (as it may be due to the bolt 45 being held against rotation) the surface 47 of the head 46 engages the surface 26 of the mounting framework 10, to clamp the swivel carriage 25 against swinging movement. However, when the swivel carriage 25 is to be swung around to another position this may be accomplished merely by loosening the nut 50.

It is evident that the engagement of the head 46 with the surface 26, as well as the similar engagement of the legs 31 therewith, serves to maintain the swivel carriage 25 assembled with the frame 10 regardless of which position the apparatus may assume in use.

It is evident that the carriage 41 is mounted for swinging movement on a horizontal axis as defined by the trunnions 37. This carriage 41 includes an end structure designated 51 formed with an opening 52 that is threaded at its outer end, as shown at 53, and which opening carries a bearing assembly referred to in its entirety at 54. A second bearing assembly 55 is disposed more centrally of the carriage 41 and in alignment with the bearing assembly 54. This second bearing assembly 55 is carried by a cage 56 that is in turn carried by a wall 57 of the carriage 41.

A shaft 58 extends through the bearing assemblies 54 and 55, being anchored to the inner members designated 59 and 60, and intermediate these members 59 and 60 carries a worm gear 61 that is keyed thereto, as shown at 62. Meshing with the worm gear 61 is a worm 63 that is keyed, as shown at 64, to a shaft 65 that constitutes the drive shaft of an electric motor referred to in its entirety by the reference character 66.

It will be noted that this worm 63 is disposed in the recess that is defined by the wall 57 and the end structure 51 of the swinging carriage 41. The structure of this carriage is continued to provide a suitable housing and support for this motor 66.

The shaft 58 extends beyond the cage 56 and a concavo-convex saw blade 67 is drivably mounted thereon by the structural arrangement shown in Figure 2 and referred to in its entirety by the reference character 68. This saw blade 67 is defined by a portion of a hollow sphere, the center of which is located on the axis defined by the trunnions 37. A nut at 69 securely holds the blade 67 and associated supporting structure in position on the shaft 58.

It is notable that the saw blade 67 has its peripheral edge formed with saw teeth 70, and in the initial position of the saw these teeth engage one of the plates $P_1$ or $P_2$ intermediate of the yoke 21.

The swinging carriage 41 is formed with a forwardly extending cap-like structure designated 71, which carries a hinged nut 72 that is pivotally mounted thereon. A feed screw 73 is threaded through the nut 72, and at its upper end carries an operating member in the form of a hand wheel 74.

A bearing member 75 is pivotally mounted on brackets 76 that upstand from the swivel carriage 25. This bearing member 75 is formed with a cup-shaped recess 77. At the upper end the recess 77 terminates in a wall 78 which is formed with an opening 79. The lower end of the feed screw 73 is of a reduced diameter and free from threads, the reduced portion being designated 80. This reduced portion 80 extends through the opening 79 into the cup-shaped recess 77. A collar 81 is slidable in the recess 77 and is connected to the reduced portion 80 of the feed screw 73 as by a pin shown at 82.

The bearing member 75 carries, at its outer side speaking with reference to the swivel carriage, an offset portion or ear 83 formed with a threaded socket 84. A stem 85 has its lower end screwed into the threaded socket 84. This stem 85 extends upwardly in a direction substantially parallel to the feed screw 73 and is spaced therefrom.

The upper portion of the stem 85 is cut away to provide a plane surface 86 in which are formed a plurality of notches 87. An abutment member 88 is formed with an opening 89 that receives the upper portion of the stem 85. This abutment member 88 carries a set screw 90 having a pointed extremity 91 that is complemental to the notches 87. This pointed end 91 is adapted to be received in any of the notches 87 to maintain the abutment member 88 in an adjusted position.

A sleeve 92 encircles the stem 85 in spaced relation with respect thereto. This sleeve 92 is formed with a slot 93 which accommodates that portion of the abutment member 88 that extends therethrough and which carries the set screw 90. At its lower end the sleeve 93 is secured to an end supporting plate 94 that is slidable about the stem 85. The screw 73 has an upper end rotatably mounted in plate 95, and a lower portion rotatably mounted in plate 94; these plates are held in fixed relation to each other by sleeve 92. At its upper end the sleeve 92 carries an end closure shown at 96.

A coil spring 97 is disposed about the stem 85 and interposed between the lower end plate 94 and the abutment member 88. Another coil spring 98 is located on the opposite side of the abutment member 88 and engages the end closure 96. This spring 98 encircles the upper portion of the stem 85. A vertically adjustable set screw 99 limits feeding of the saw to the work.

The mode of operation of the above described apparatus may be briefly outlined as follows:

Two yokes 21 having legs 22 of proper length corresponding to the thickness of the plates $P_1$ and $P_2$ or the size of the specimen to be removed, are positioned in the recesses 20 of the mounting frame 10 prior to application of the mounting frame 10 to the bolts 11. After the mounting frame 10 has been securely clamped in position by the nuts 18, the hand wheel 74 is operated to turn the feed screw 73 to move the swinging carriage 41 about the pivotal axis defined by the trunnions 37 so that the saw teeth 70 are positioned slightly above the surface of the respective plate $P_1$ or $P_2$. The motor M is now started in operation and the power therefrom transmitted through drive shaft 65, worm 63, worm gear 61 and shaft 58 to drive the saw 67 under power.

As the saw blade 67 rotates rapidly, the hand wheel 74 is manually operated to turn the feed screw 73. In most working positions, as this feed screw 73 is rotated, it compresses spring 97 and cap-like structure 71 is moved yieldably toward the weld. At any moment in these positions, when the normal amount of pressure applied to the spring might be excessive, due to extraordinary resistance to rotation of the saw, the pressure is relieved through spring 97 and upon cessation of the unusual resistance the spring yieldably again feeds the saw to the weld.

To test a weld in a substantially vertical wall with the axis of pivot pins 33 above the saw 67, the spring 98 is placed under compression by movement of abutment 88 to relieve the saw of the excess pressure caused by the effect of gravity in this particular position. In positions generally similar to this one, gravity alone exerts sufficient pressure to urge the saw into the weld and it is desirable to offset gravity pressure by spring 98 to some extent. In such positions, if the rotation of the saw is resisted an extraordinary amount, it can move away from the weld against gravity and then is moved into the weld by gravity when the resistance is passed.

Thus, in all positions yieldable and semi-automatic feeding is provided due to the construction and operation of the parts. It is necessary alone for the operator to compensate for the progress of the saw by progressive movement of the feed screw in order to cause yieldable and semi-automatic feeding by spring 97 and gravity.

After one of the plates, say for instance the plate $P_1$, has been cut through a required distance and set screw 99 prevents further cutting, the saw blade 67 is removed from the cut by rotating the feed screw 73 in a reverse direction. During the operations just described the swivel carriage 25 will have been securely held in position, because the nut 50 will have been tightened, causing the surface 47 of the head 46 to engage the surface 26 of the mounting frame 10. Moreover, this swivel carriage will have been rotated to accurately position the saw blade 67, the calibrations at 100 on the swivel carriage 25 cooperating with one of the pointers 101 on the mounting frame 10.

After the saw blade 67 is raised out of the cut which has been formed in the plate $P_1$, the nut 50 is loosened and the swivel carriage swung around substantially 180° so that the saw blade 67 is positioned to form the cut in the plate $P_2$, which completes the cutting out of the boat-like specimen. Again accurate positioning of the saw blade may be had due to the calibrations 100 and pointer 101 on carriage 25 and frame 10, respectively.

After the boat-like specimen has been cut out the probing apparatus may be removed by taking off the nuts 18 and lifting the framework 10 from the bolts 12. The latter may now be knocked off (as the tack welds 14 may be easily fractured) and the recess left by the removal of the specimen S may be readily filled by using an appropriate welding material.

It is evident that the apparatus above described is of a compact nature, and it is necessary to mount the same on the plates but once, and which mounting suffices for forming both the cuts necessary to taking out the boat-shaped specimen. Moreover, means are provided for insuring that the saw blade is accurately positioned for the formation of the cuts. Furthermore, the mechanism for feeding the saw blade to the work insures against injury to the blade.

Moreover, the means provided for feeding the saw blade to the work is of a yielding nature which accommodates gravity action. Thus, the apparatus is readily adaptable for use in any horizontal, vertical or overhead positions.

While a preferred specific embodiment of the invention is hereinbefore set forth it is to be clearly understood that the invention is not to be limited to the exact construction illustrated and described, because various modifications of these details may be provided in putting the invention into practice within the purview of the appended claims.

I claim:

1. Weld probing apparatus of the character described comprising a concavo-convex saw, power means for driving said saw, and mechanism for yieldably feeding said saw to the work which is to be cut.

2. Weld probing apparatus of the character described comprising a mounting framework, means for anchoring said framework to plates having a welded joint which is to be probed, a concavo-convex saw operatively carried by said framework, power means for driving said saw, and mechanism for feeding said saw to the plates.

3. Weld probing apparatus of the character described comprising a mounting framework, means for anchoring said mounting framwork to plates having a weld which is to be probed, a swivel carriage rotatably mounted in said framework, a cutting element operatively carried by said swivel carriage, means for driving said cutting element, and locking means for detachably locking said carriage in position in said framework.

4. Weld probing apparatus of the character described comprising a mounting framework, means for anchoring said framework to plates having a welded joint that is to be probed, a swivel carriage rotatably mounted in said framework, a swinging carriage pivotally mounted on an axis normal to the axis of said swivel carriage, a cutting element carried by said swinging carriage, and mechanism for moving said swinging carriage on its axis to feed the cutting element to the plate which is to be cut.

5. In weld probing apparatus of the character described, a cutting element for cutting a weld, means for driving said cutting element, mechanism for feeding said cutting element to the weld, and carriage structure for supporting said cutting element in effective position comprising a mounting framework, and a swivel carriage rotatably mounted in the mounting framework and which swivel carriage carries the said cutting element and associated mechanism.

6. In weld probing apparatus of the character described, a cutting element for cutting a weld, means for driving said cutting element, mechanism for feeding said cutting element to the weld, and carriage structure for supporting said cutting element in effective position comprising a mounting framework, means for anchoring the framework on the plates having a weld which is to be probed, a swivel carriage rotatably mounted in the framework and carrying said cutting element and associated mechanism, and indicia on said carriage and framework respectively for indicating the position of said cutting element with respect to the weld which is to be probed.

7. In weld probing apparatus of the character described, a cutting element for cutting a weld, means for driving said cutting element, mechanism for feeding said cutting element to the weld, and carriage structure for supporting said cutting element in effective position comprising a mounting framework, a swivel carriage rotatably mounted in said framework and carrying said cutting element and associated mechanism, and detachable means for locking said carriage immovably on said framework.

8. In weld probing apparatus of the character described, a cutting element for cutting a weld, means for driving said cutting element, mechanism for feeding said cutting element to the weld, and carriage structure for supporting said cutting element in effective position comprising a mounting framework, a swivel carriage carried by said framework to rotate on an axis perpendicular to the plates having the weld which is to be probed, a swinging carriage mounted for pivotal movement on an axis substantially parallel to the said plates, a drive shaft rotatably mounted in said swinging carriage carrying said cutting element at one end and drivably connected to said driving means, and mechanism for varying the angular position of said swinging carriage to feed or withdraw the cutting element to or from the plates.

9. In weld probing apparatus of the character described, a swivel carriage, and a swinging carriage pivotally mounted on said swivel carriage, mechanism for adjusting the relative position of said swinging carriage with respect to the swivel carriage comprising a threaded nut hingedly mounted on the said swinging carriage, a bearing element hingedly mounted on the swivel carriage, a feed screw threaded in said nut and passing through said bearing element, yielding means for controlling longitudinal movement of said feed screw with respect to the bearing element, and an operating member for said feed screw.

10. In weld probing apparatus of the character described, structure for mounting a cutting element and its associated operating instrumentalities on plates having a weld which is to be probed, comprising a mounting framework formed with a plurality of openings, and a corresponding number of fastening elements passing through said openings and tack welded to the plates.

11. In weld probing apparatus of the character described, structure for mounting a cutting element and its associated operating instrumentalities on plates having a weld which is to be probed comprising a mounting framework having a plurality of openings therein, a plurality of threaded bolts corresponding in number to the openings in the framework having their heads tack welded to the plates so that the relative position of the bolts corresponds to the position of said openings in the framework, the said bolts being received in said openings, and nuts on said bolts for securely clamping the framework in position.

12. In weld probing apparatus of the character described, structure for mounting a cutting element and its associated operating instrumentalities on plates having a weld which is to be probed comprising a mounting framework formed with a plurality of openings, a corresponding number of fastening elements passing through said openings and tack welded to the plates, and a yoke detachably secured to said framework and having depending legs that are adapted to engage the plates on each side of the weld which is to be probed.

13. In weld probing apparatus of the character described, the combination with a mounting framework of a swinging carriage pivotally mounted thereon, screw mechanism for adjusting the position of said swinging carriage with respect to said framework, and yielding means associated with said screw mechanism whereby the effect of said screw mechanism is rendered of a yielding nature.

14. Mechanism for positioning weld probing apparatus on plates having a weld which is to be probed comprising a template having a central portion adapted to engage and overlie a welded joint, said central portion being formed with a spotting opening, inclined side portions extending outwardly from said central portions, and structure at the corner of each of said side portions formed with openings designed to carry bolts in a required spaced relation.

15. Weld probing apparatus of the character described comprising a mounting framework, means for anchoring said framework to plates having a welded joint which is to be probed, a cutting element movably carried by said framework, mechanism for feeding said cutting element to said plates, and means for adjusting the effective position of said cutting element.

16. Weld probing apparatus of the character described comprising a mounting framework, means for anchoring said framework to plates having a welded joint which is to be probed, a rotating cutting element movably mounted in said framework, power means for driving said cutting element, and means for adjusting the effective position of said cutting element.

17. In weld probing apparatus of the character described the combination with a mounting framework, a swivel carriage mounted on said framework, a swinging carriage pivotally mounted on said swivel carriage, and a feed screw for adjusting the position of said swinging carriage with respect to said swivel carriage, of means associated with said feed screw and carriage for rendering feeding actuation of said swinging carriage of a yielding nature, said means comprising a sleeve carried by said feed screw, a rod within said sleeve having one end anchored to said swivel carriage, an adjustable abutment member carried by said rod, a spring interposed between said abutment member and one end of said sleeve, and a second spring interposed between the abutment member and the other end of said sleeve.

18. In weld probing apparatus of the character described the combination with a mounting framework, a swivel carriage mounted on said framework, a swinging carriage pivotally mounted on said swivel carriage, and a feed screw for adjusting the position of said swinging carriage with respect to said swivel carriage, of means associated with said feed screw and carriage for rendering feeding actuation of said swinging carriage of a yielding nature, said means comprising a sleeve carried by said feed screw and disposed in spaced parallel relation with respect thereto, a rod having one end anchored to said swivel carriage and extending upwardly into said sleeve, an abutment member adjustable on said rod, means for holding said abutment member in an adjusted position, an end closure for said sleeve at the top, a spring in said sleeve interposed between said end closure and said abutment member, and a second spring disposed in said sleeve about said rod engaging the abutment member at one end and the lower sleeve end at the other.

19. In weld probing apparatus of the character described the combination with a mounting framework, a swivel carriage mounted on said framework, a swinging carriage pivotally mounted on said swivel carriage, and a feed screw for adjusting the position of said swinging carriage with respect to said swivel carriage, of means associated with said feed screw and carriage for rendering feeding actuation of said swinging carriage of a yielding nature, said means comprising a pair of springs associated with said feed screw, and means for rendering one of said springs effective whereby gravity action is either opposed or aided by one of said springs.

EDMOND B. MAILLART.